March 30, 1937.   C. J. ANDERSON, JR   2,075,418
POWER TRANSMISSION
Filed Nov. 11, 1932   4 Sheets-Sheet 1

Inventor
CHARLES J. ANDERSON JR.
By Ralph L. Tweedale
HIS Attorney

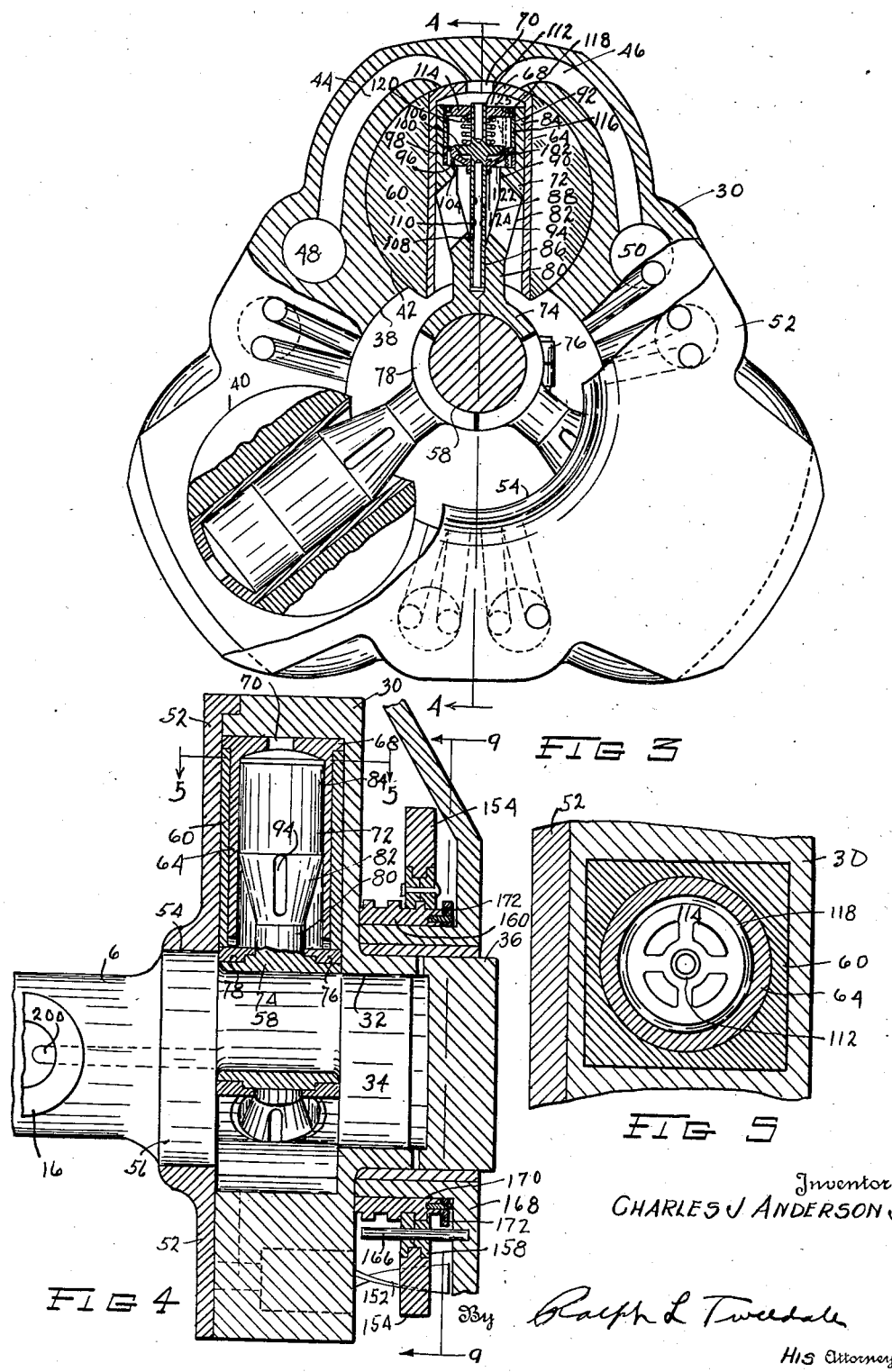

March 30, 1937.　　C. J. ANDERSON, JR　　2,075,418
POWER TRANSMISSION
Filed Nov. 11, 1932　　4 Sheets-Sheet 3
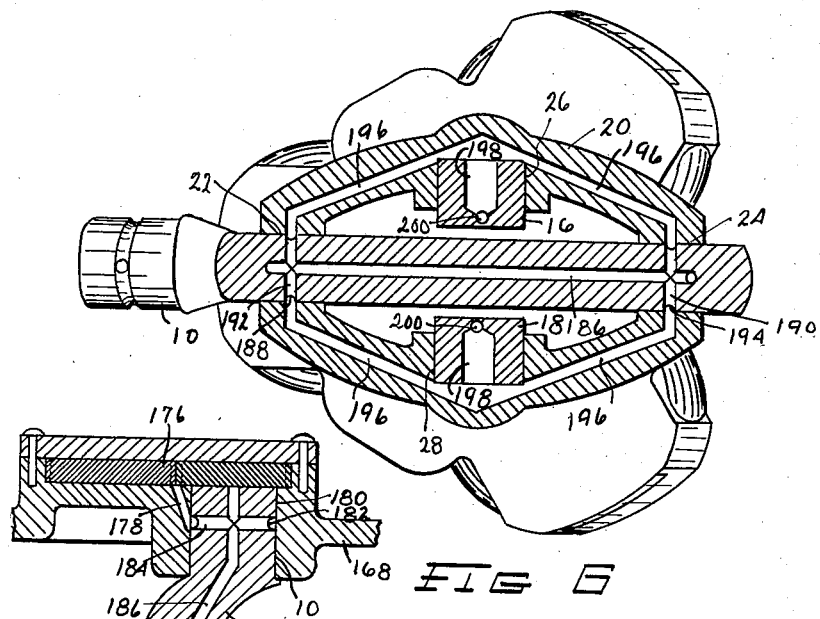
Fig 6
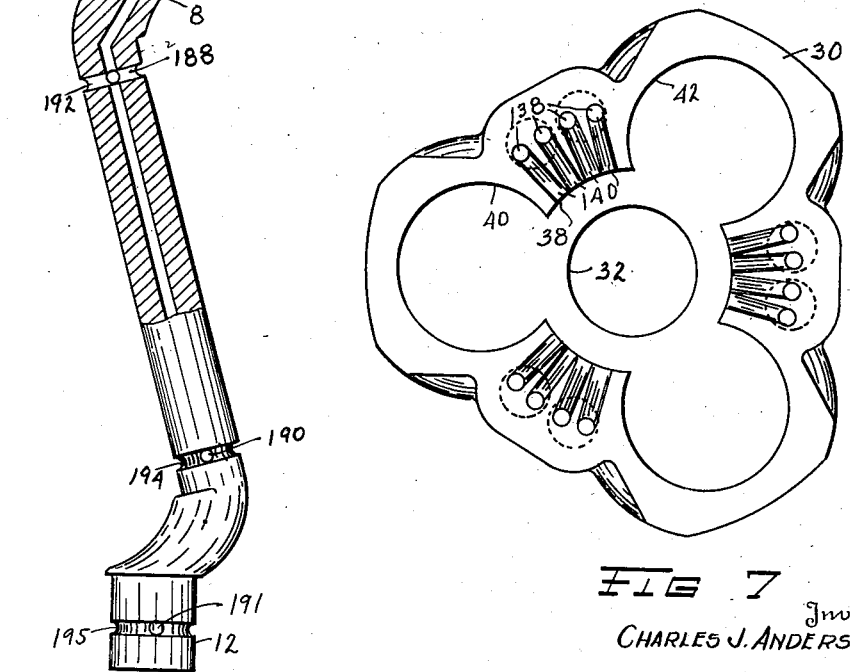
Fig 8
Fig 7
Inventor
CHARLES J. ANDERSON JR.
By Ralph L. Tweedale
His Attorney

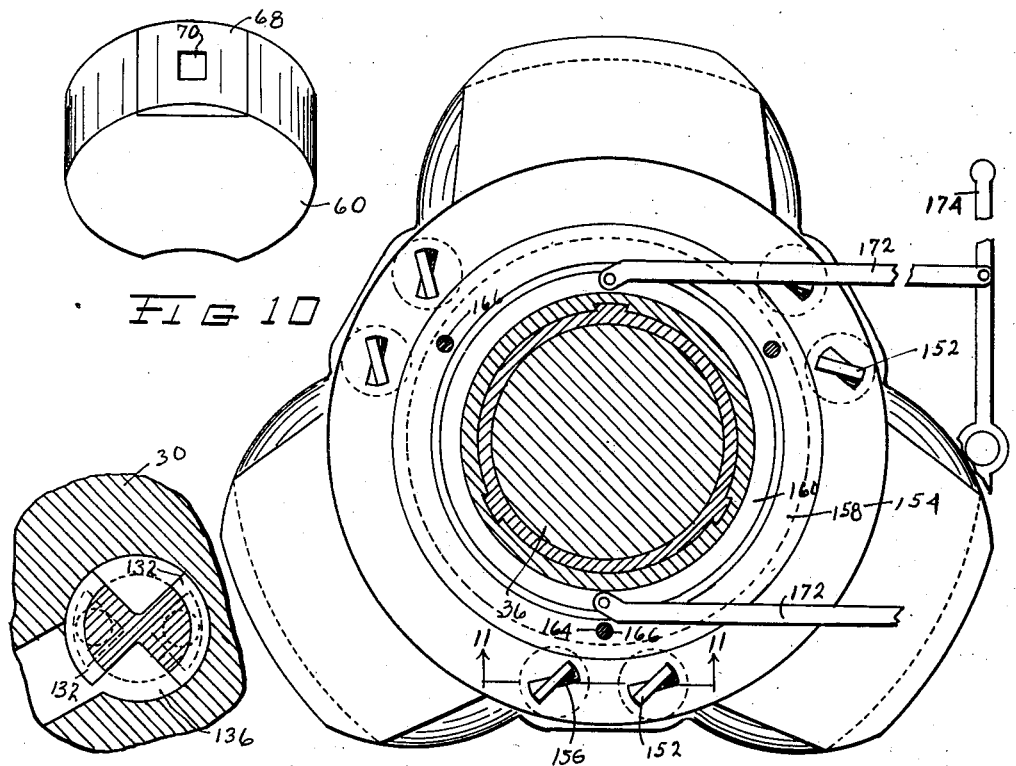

Patented Mar. 30, 1937

2,075,418

UNITED STATES PATENT OFFICE 2,075,418

POWER TRANSMISSION

Charles J. Anderson, Jr., Jamestown, N. Y.

Application November 11, 1932, Serial No. 642,320

38 Claims. (Cl. 74—389.5)

This invention relates to clutches, particularly one-way clutches of the fluid type. The objects of the invention are:

To provide a clutch having control means associated therewith for controlling the direction of engagement of the clutch, that is to say, for selectively predetermining the direction of rotation in which the clutch will be effective as a driving element while permitting free rotation in the opposite direction;

To provide a clutch having control means for varying the amount of effective engagement of the clutch in a given direction;

To provide a clutch of the fluid type capable of operation at higher speeds than those previously devised;

To provide in a fluid clutch means for applying pressure to the fluid body on the intake side of the clutch;

To provide a novel operating means for a one-way clutch whereby the driving member thereof may be given an oscillating motion;

To provide an improved and more reliable intake valve for a fluid clutch of the one-way type;

To provide a control valve for a fluid clutch which will be more easily movable while the clutch is under full load; and To provide a simple, economical and thoroughly reliable one-way clutch capable of withstanding hard usage under long and continued operation.

Further objects and advantages of the present invention will be apparent from the following description, reference being had to the accompanying drawings, wherein a preferred form of the present invention is clearly shown.

In the drawings:

Figure 3 is an elevation partly in section of the clutch showing the relative positions of the parts;

Figure 4 is a vertical sectional view taken substantially on the line 4—4 of Figure 3.

Figure 5 is a horizontal sectional view of the valve cage and is taken substantially on the line 5—5 of Figure 4;

Figure 6 is a sectional view through the Z-crank and the yoke showing the oil passages and is taken substantially on the line 6—6 of Figure 1;

Figure 7 is an elevation of the clutch housing from the cover side;

Figure 8 is a view of the Z-crank partly in section showing the oil passageways;

Figure 9 is a vertical sectional view taken substantially on the line 9—9 of Figure 4;

Figure 10 is a perspective view of the cylinder retaining disc;

Figure 11 is an enlarged sectional view through the valves and is taken substantially on the line 11—11 of Figure 9;

Figure 12 is a horizontal sectional view of one of the valves taken substantially on the line 12—12 of Figure 11; and Figure 13 is a view similar to that shown in Figure 12 with the ports in closed position.

Figure 1:
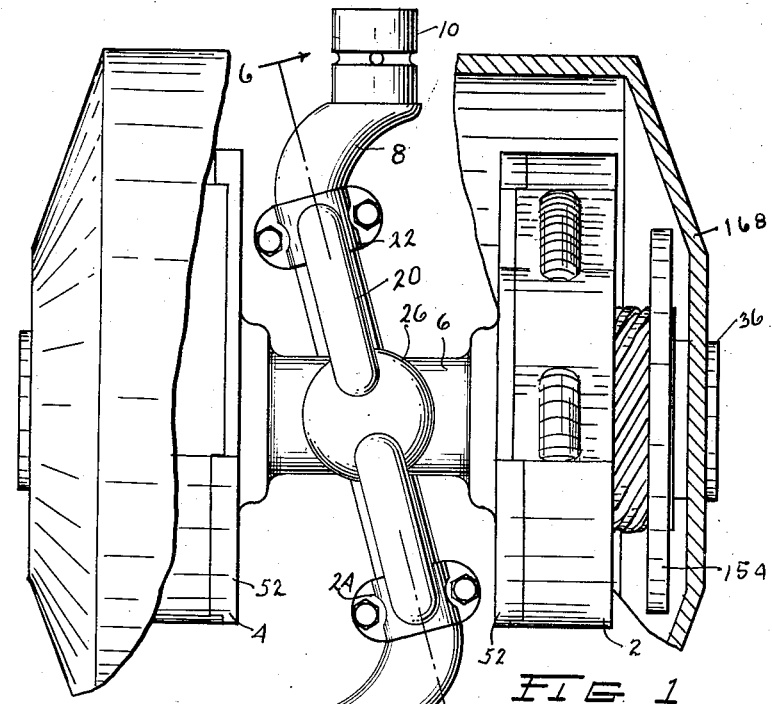
Figure 1 is a plan view of the clutch assembled.
Figure 2:
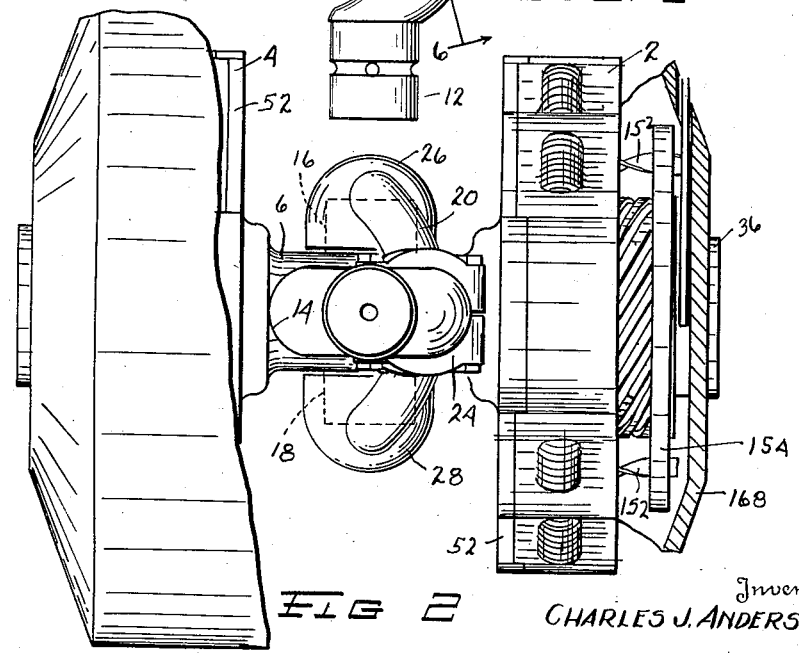
Figure 2 is an elevation of the device shown in Figure 1.

According to the present invention a pair of one-way clutches, generally designated at 2 and 4 in Fig. 1, have a common shaft 6 forming part of the driving element of each. Means is provided for giving the shaft 6 oscillatory movement about its own axis which may comprise a Z-shaped crank 8 having journal portions 10 and 12 at its opposite ends for co-action with suitable bearings. The Z-crank 10 is adapted for continuous rotation in one direction about the axis of the journals 10 and 12, which axis lies perpendicular to the axis of the shaft 6 and intersecting the same. The shaft 6 has an elongated hole 14 therein and through which the Z-crank passes, preferably with a slight clearance to avoid contact with the same. Integrally formed with the shaft 6 are a pair of journals 16 and 18 having their axes perpendicular to the axis of shaft 6 and also perpendicular to the axis of journals 10 and 12, all three of these axes intersecting in a common point. A yoke member 20 surrounds the Z-crank and the journals 16 and 18. The yoke 20 is split along the axis of the Z-crank 8 and has bearings 22 and 24 on the angular portion of the Z-crank. Bearings 26 and 28 formed in the yoke 20 fit on the two journals 16 and 18 respectively. In this manner there is provided a simple mechanism for oscillating the shaft 6 from a constantly rotating shaft at right angles to and in the same plane with the shaft 6. It will be noted that this construction employs but a single split member, thus making for a simpler and more rugged construction of the important parts.

The present device is particularly adapted for use in a motor vehicle having an automatic continuously variable transmission of which this device may form a part, although it will be understood that the invention is not limited to such a use. When employed in a motor vehicle construction the shaft 6 may preferably be located on the axis of the driving axle of the vehicle while the Z-crank journals 10 and 12 may lie on the axis of the propeller shaft or crank shaft of the motor vehicle engine.

Coming now to the construction of the one-way clutches 2 and 4 which being identical will necessitate a description of only one of them, the general arrangement is shown in Figs. 3, 4, and 5. A casing 30 is provided having a bearing 32 located centrally thereof for receiving a journal portion 34 of the shaft 6. The casing 30 and its associated parts, later to be described, form the driven member of the clutch. The load to be driven may be connected in any suitable manner to the boss 36 which forms a part of the casing 30. The interior of the casing 30 has a central cavity 38, preferably of circular shape and of the smallest size, permitting sufficient clearance for the interior parts of the clutch. Adjacent to the cavity 38 there is formed preferably a plurality of cavities 40 and 42 equally spaced about the circumference of the casing and having the shape of short flat cylinders. There are three such cavities in the mechanism disclosed, all of which and the parts associated therewith are identical, and only one of which will be described. At the outermost portion of cavity 42 are located passages 44 and 46 opening into the cavity 42 and spaced apart by a distance approximately equal to the opening of each passage. At their opposite ends the passages 44 and 46 open into valve chambers 48 and 50 respectively. The open side of the casing 30 is closed by a cover plate 52 removably secured thereto and having a central bearing 54 therein for reception of a journal portion 56 on the shaft 6. Intermediate the journal portions 56 and 34 of the shaft 6 is located a journal portion 58 which is eccentric to the axis of the journals 34 and 56 and forms a crank. Within the cavity 42, in the casing 30 is located a block 60, preferably formed of very light metal, and serving both as an oscillating cylinder support and as a filler block to take up space within the casing 30 and thus reduce the amount of idle fluid in the interior thereof. The block 60 has a cylindrical bore therethrough within which is tightly fitted a cylinder liner 64. The head portion 68 of the liner 64 is formed as a continuation of the outer surface of the block 60. Centrally located in the head portion 68 is a port 70 of a width substantially equal to the opening of the passages 44 and 46 and to the space between them.

Within the cylinder liner 64 is a piston 72 having an arcuate shaped bearing portion 74 at the bottom thereof to rest on the crank journal 58. The total angular length of all of the arcuate bearings is somewhat less than a complete circle to permit the necessary relative movement on the crank 58 between the different bearing portions caused by rotation of the parts. A pair of retaining rings 76 and 78 surrounds bearing 74 and the corresponding bearings of the other pistons to hold them in snug bearing engagement with the crank 58. The piston 72 is formed with a reduced neck portion 80 at the base thereof and a tapered portion 82 immediately above the portion 80, the upper portion 84 thereof being of the proper diameter to fit snugly but slidably in the liner 64. A small bore 86 is provided centrally of the base portion 80, the bore extending upwardly in a tapered portion 88 above the portion 86, an intermediate cylindrical portion 90 and a top portion 92 of largest diameter. Slots 94 are formed in the tapered portion 82 of the piston to form a fluid path from the outside of the piston to the inside thereof. A shoulder 96 formed between the bores 90 and 92 supports a ring 98 having an inwardly turned flange 100 thereon forming a downwardly opening valve seat. A ring 102 forms a closure for the valve seat 100 and is maintained normally in closed position by spring 104 also resting on the flange 96. The interior of the ring 102 forms a second valve seat opening upward. An intake valve 106 is provided for closing the second valve seat and has a downwardly extending stem 108, preferably of tubular form for lightness, and which extends into the small bore 86 at the base of the piston for sliding movement therein. Holes 110 are provided in the sides of the stem 108 to relieve fluid pressure at the bottom of the bore 86. The upper portion of the valve 106 is provided with a stem 112, preferably also of tubular construction. A guide plate 114 of skeleton form, see Fig. 5, rests in the top of the bore 92 upon a spacing cylinder 116 resting on the ring 98. The plate 114, cylinder 116 and ring 98 are retained in position by a spring retainer ring 118 resting in grooves in the plate 114 and in the top of the bore 92. A spring 120 bears against the bottom portion of the plate 114 and holds the valve 106 normally in closed position. The ring 102 has formed integrally therewith a plurality of arms 122 connecting the same with a guide cylinder 124 slidably mounted on the lower valve stem 108. For the purpose of lubricating bearings 74, a passage 125 is formed in the wall of the piston 72 connecting the interior of the cylinder with the bearing surface on crank 58. The dimensions of this passage are such that the proper amount of fluid resistance is maintained to keep a good oil film at the bearing without materially reducing pressure in the cylinder.

Referring now to Figs. 9, 11, 12 and 13, there is illustrated a control valve mechanism for controlling the flow of fluid in the passages 44 and 46, it being understood that these valve structures are duplicated around the clutch, a pair of them being provided for each cylinder and piston assembly. Inasmuch as each of these valves is of identical construction to the others only one will be described. A valve member 126 is provided having a cylindrical body portion 128, a reduced stem portion 130 and a pair of oppositely disposed valve closing flanges 132. The flanges 132 together extend through approximately one-third the circumference of the valve body, the intermediate portion of the valve body being cut away, as indicated, at the intermediate portions 134. The bottom of the valve member is preferably a flat surface adapted to rest upon a seat 136 in the bottom of the valve chamber 48. A pair of ports 138 are provided in the valve seat 136 and pass through the clutch casing to the cover side thereof where they communicate with radial passages 140 leading to the central cavity 38, as shown in Fig. 7.

The ports 138 being diametrically disposed about the axis of the valve member 126 may be opened by turning the valve so that the cutaway portions 134 overlie the ports 138 or they may be closed by turning the valve 126 so that the flanges 132 overlie the ports 138. Any intermediate degree of opening may, of course, be provided for rotation of the valve 126 to a suitable position. A fluid seal assembly 142 is provided about the valve body 128 and rests on a shoulder 144 formed in the under portion of the valve chamber 48. A retaining plug 146 is threaded in the bore 148 above the shoulder 144 and holds the fluid seal 142 in position as well as the valve member 126, the latter by means of the cooperating shoulders 150 formed on the valve member 126 and on the retaining plug 146.

In order to make the valve readily movable under the high fluid pressure prevailing when the clutch is under full load, the valve member 126 is so proportioned that the area of the flanges 132 exposed to downward pressure is made substantially equal to but preferably slightly greater than the effective area of the cut away portions 134 exposed to upward pressure. The slight resultant downward pressure produced by having the area of the flanges 132 slightly in preponderance acts to retain the valve on its seat without causing sufficient friction to impede rotation of the valve under high fluid pressure in the passage 144.

Means is provided for operating the valve 126 and comprises a flat twisted shank 152 secured to or formed integrally with the valve stem 130. An annular plate 154 located outside the clutch casing has elongated slots 156 formed therein for receiving each of the twisted shanks 152. Motion of the annular plate 154 toward and away from the clutch casing 30 acts to rotate the twisted shanks 152 on the valves.

Referring to Fig. 4 the plate 154 is mounted by a tongue groove connection on an internal annular plate 158, the tongue groove connection permitting the plate 154 to rotate relative to the plate 158, but preventing lateral movement thereof. The plate 158 is screw-threaded internally to mate with a screw thread formed on a sleeve 160. The plate 158 has holes 164 formed therein through which pass guide pins 166 secured to a fixed part such as the casing 168 which surrounds the entire mechanism. The sleeve 160 is rotatably mounted on a journal 170 formed on the casing 168. The sleeve 160 may be rotated by means of a pair of links 172 pivoted thereto and adapted to be actuated by a manually operable lever 174 or other suitable control mechanism.

Means is provided for enabling the clutch to be operated at higher speed than would otherwise be possible and comprises suitable instrumentalities for maintaining fluid in the cavity 38 at high pressure. These may comprise a gear type oil pump 176 operable by rotation of the Z-crank 8 and having an intake passage, not shown, leading from the bottom of the casing 168 and an outlet passage 178 leading to a bearing 180 formed in the casing 168 and surrounding the journal 10. An oil groove 182 is formed in the journal 10 and communicates with a transverse bore 184 therethrough. A fluid passage 186 is formed through the interior of the Z-crank 8 and communicates by transverse portions 188, 190 and 191 with corresponding oil grooves 192, 194 and 195 in the Z-crank located at the bearings 22 and 24 and journal 12 respectively. Within each half of the yoke member 20, fluid passages 196 are formed connecting the bearings 22 and 24 with interior bores 198 in the journals 16 and 18. From the bores 198 fluid passages 200 are formed in the shaft 6 leading to the interior cavity 38 in the casing 30.

In operation the Z-crank 8 may be rotated on the journals 10 and 12 by any suitable means continuously in one direction. The angular portion of the Z-crank 8 moves in a path describing a pair of cones and imparts to the yoke 20 a corresponding motion. This may be considered to consist of an oscillation about the axis of the journals 16 and 18 combined with a simultaneous oscillation 90° out of phase therewith about the axis of the shaft 6. Inasmuch as the yoke 20 is freely rotatable upon the journals 16 and 18 the oscillation about these journals is not transmitted to the shaft 6, only the oscillation about the axis of shaft 6 being transmitted thereto by the yoke 20.

Referring now to Figs. 6 and 8 the casing being partially filled with an inelastic lubricating fluid, such as oil, the fluid pump 176 will take fluid from the bottom of the casing and force it under pressure into the passage 178. From there it flows to the bearing 180 for lubricating the same and into the passages 184 and 186. From the passage 186 the fluid flows to the passages 188, 190 and 191 and grooves 192, 194 and 195 to bearings 22 and 24 and journal 12, maintaining a supply of lubricant thereon. From the bearings 22 and 24 the fluid flows through the passages 196 to the journals 16 and 18, maintaining a supply of lubricant under pressure thereon, and also flowing into the bores 198 to the passages 200 and into the chamber 38. Thus it will be seen that the fluid pump 176 maintains a continuous supply of fluid under pressure in the chamber 38 as well as supplying the bearings of the clutch driving means with lubricant under pressure.

Referring now to Fig. 3 it will be seen that if the crank 58 be rotated counterclockwise, it will cause each of the pistons in turn to move into the cylinder while the passage 44 is in communication with the port 70, while if the crank 58 be rotated clockwise, it will cause each of the pistons in turn to move into the cylinder while the passage 46 is in communication with the port 70. This is of course due to the oscillation of blocks 60 in the cavities 40, 42, etc., as the pistons 72 follow crank 58 around. In either direction of rotation of the crank 58 as the pistons move out of their cylinders, fluid flows from the chamber 38 through the passages 94 to the interior of the piston. The valve 106 automatically opens on the down stroke of the piston and permits the fluid to flow into the cylinder, the valve closing, of course, as soon as the piston starts to move back into the cylinder. It will thus be seen that if the passage 44 be blocked by closure of the valve in valve chamber 48, counterclockwise rotation of the crank will tend to move the piston into the cylinder, but the column of inelastic fluid between the piston head and the valve in chamber 48 prevents such movement. In order for counterclockwise rotation of the crank 58 to take place, therefore, it is necessary that the casing 30 rotate as a body. In other words, the column of fluid forms a positive driving connection between the shaft 6 and the driven shaft. If, however, the crank 58 is rotated clockwise as the piston enters the cylinder the fluid is forced into passage 46, which is open at the valve chamber 50, and thus permits the fluid to be forced back into the chamber 38 through the passage 140 with negligible resistance. Therefore, no driving connection can be formed between the shaft 6 and the casing 30 upon clockwise rotation of the crank 58 under these conditions. It will be clear, of course, that with the valve in chamber 48 open and the valve in chamber 50 closed, a driving connection will be produced upon clockwise rotation of the crank 58 and no driving connection produced on counterclockwise rotation. It will also be clear that with a partial closure of the valves in either chamber 48 or chamber 50 the engaging action of the clutch can be varied from a positive connection to a slipping one with a varying amount of slippage, depending upon the amount of closure of the valves. Likewise it is apparent that with the valves in chambers 48 and 50 both open the crank 58 may be rotated in either direction without rotating the housing 30, thus entirely preventing engagement of the clutch.

The operation of the valves in chambers 48 and 50 is accomplished by means of the manual control member 174, which, acting through the links 172, rotates the sleeve 160 on its journal. The threads on the sleeve 160 in turn move the plate 158 laterally in Fig. 4 and with it the plate 154. As the plate 154 moves laterally, it simultaneously rotates the twisted shanks 152 of all of the valves 126. The valves are so located in the chambers that when plate 154 is at the limit of its movement in one direction the valves in each chamber 48 will be completely closed by the flanges 132, covering ports 138, while the valves in each chamber 50 will be fully open by virtue of the cutaway portions 134 being opposite the holes 138. When the plate 154 is at the other limit of its movement the valves in chambers 48 will be open, while the valves in chambers 50 will be closed. Since the cut-away portions occupy a greater portion of the circumference of the valves than the flanges 132 it will be seen that when the plate 154 is in its mid-position all of the valves be open.

In case of excessive loads on the driven shaft, which would cause a fluid pressure in whichever cylinder happened to be taking the load at the moment to rise beyond a safe value, the valve ring 100 will be allowed to move downwardly by the spring 98, thus relieving the pressure to keep it within safe limits.

It will therefore be seen that the invention provides a clutch having means for oscillating its driving member from a constantly rotating shaft and a control means for controlling the engaging action of the clutch to vary this engaging action both in direction and also in amount in either direction, as well as to prevent all engaging action of the clutch. The invention also provides a fluid clutch capable of operation as a one-way clutch and having means for maintaining a supply of fluid under pressure on the intake side of the clutch. This enables the clutch to be operated at considerably higher speeds than would otherwise be possible.

The invention also provides means for lubricating under-pressure all of the bearing surfaces of the clutch. The bearings of the clutch driving mechanism are lubricated, as has been described, from the passages through the Z-crank and the yoke member 20. The bearings 54 and 32 are lubricated from the body of lubricant under pressure in the chamber 38, while the arcuate bearings 74 are lubricated from the fluid under pressure in their respective cylinders through the passages 125.

While the form of embodiment of the invention as herein disclosed constitutes a preferred form, it is to be understood that other forms might be adopted, all coming within the scope of the claims which follow.

What I claim is:

1. In a fluid clutch, the combination of a driving element, a driven element, a fluid pump operable by a relative rotation of said elements, a shaft at right angles to the axis of the driving element, a Z-shaped crank on said shaft passing through an elongated opening in the driving element, transverse journal members on opposite sides of said driving element and in the plane of said shaft, and a split yoke member surrounding said crank and driving element and having bearings at opposite ends of said crank and at said journal members.

2. In a fluid clutch, the combination of a driving element, a driven element, a fluid pump operable by a relative rotation of said elements, a reservoir for fluid to be pumped, a shaft at right angles to the axis of the driving element, a Z-shaped crank on said shaft passing through an elongated opening in the driving element, transverse journal members on opposite sides of said driving element and in the plane of said shaft, a split yoke member surrounding said crank and driving element and having bearings at opposite ends of said crank and at said journal members, a bearing for said shaft, fluid passages in said shaft, crank, yoke and driving element for conducting fluid from said bearing to said reservoir, and a pump for pumping fluid to said bearing.

3. In a fluid clutch, the combination of an oscillating driving member, a driven member, a fluid pump comprising two relatively movable members one connected to each member, and valve means for controlling the fluid flow through said pump and movable to a first position in which relative motion between said members in one direction only is blocked and movable to a second position in which relative motion between said members in the opposite direction only is blocked.

4. In a fluid clutch, the combination of an oscillating driving member, a driven member, a fluid pump including a piston operatively associated with one member, a cylinder operatively associated with the other member, means forming a passage for fluid to be pumped to and from said cylinder, and means positively operated by relative motion of said members to block the flow of fluid in one direction of relative motion of said members while permitting substantially free flow of fluid in the opposite direction.

5. In a fluid clutch, the combination of an oscillating driving member, a driven member, relatively movable means forming an expansible chamber one of said relatively movable means moving with the driving member and the other moving with the driven member, means forming a valve controlled intake passage to said chamber, means forming an outlet passage from said chamber, and valve means positively operable by relative movement of said driving and driven members to selectively control the fluid flow through said outlet passage in different manners according to the direction of said relative movement.

6. In a clutch, the combination of an oscillating driving member, a driven member, clutching means for causing driving engagement between said members automatically according to the direction of relative motion between said members, and means for controlling said clutching means movable to progressively vary the engagement of said clutching means from zero up to full engagement in one direction while permitting substantially free relative rotation between said members in the opposite direction and also movable to progressively vary the engagement of said clutching means from zero up to full engagement in said opposite direction while permitting substantially free relative rotation between said members in said one direction.

7. In a fluid clutch, the combination of a driving member, a driven member, a fluid pump including piston means operatively associated with one member, cylinder means operatively associated with the other member, an automatic intake valve of the poppet type in a wall of one of said means comprising a disk shaped head, a stem having a portion on each side of said head, separate guides for each of said portions for closely constraining the motion of said valve to a truly reciprocatory movement, and a spring for yieldably holding the valve seated.

8. In a fluid clutch, the combination of a driving member, a driven member, a fluid pump operable by relative rotation of said members, an outlet passage leading from said fluid pump, a selectively operable control valve in said passage comprising a seat, a port in said seat, a valve member for covering and uncovering said port, the effective area of said valve member exposed to the outlet pressure of said pump in a direction toward said seat being substantially equal to the effective area of said valve member exposed to the outlet pressure of the pump in a direction away from the seat.

9. In a fluid clutch, the combination of a driving member, a driven member, a crank shaft associated with one of said members, a piston having a bearing rigidly secured thereto and mounted on said crank shaft, a casing associated with the other member, and a cylinder surrounding the piston and having means for mounting the same for oscillatory movement in the casing, said means comprising a short cylindrically shaped block of light metal.

10. In a fluid clutch, the combination of a driving member, motion converting means for receiving a unidirectional torque from a suitable source of power and for transmitting an alternately reversing torque to the driving member, a driven member, and means for selectively transferring alternate torque impulses from the driving member to the driven member comprising a fluid pump operable by relative motion between the driving member and the driven member, an intake passage for fluid to be pumped, an outlet passage for the pumped fluid, and valve means controlling the outlet passage for selectively determining the direction of the alternate torque impulses transferred.

11. In a fluid clutch, the combination of a driving member, motion converting means for receiving a unidirectional torque from a suitable source of power and for transmitting an alternately reversing torque to the driving member, a driven member, and means for selectively transferring alternate torque impulses from the driving member to the driven member comprising a fluid pump operable by relative motion between the driving member and the driven member, an intake passage for fluid to be pumped, an outlet passage for the pumped fluid, valve means controlling the outlet passage for selectively determining the direction of the alternate torque impulses transferred, and means for positively maintaining the fluid in the intake passage under a pressure considerably above atmospheric.

12. In a fluid clutch, the combination of a driving member, members constituting motion converting means for receiving a unidirectional torque from a suitable source of power and for transmitting an alternately reversing torque to the driving member, a driven member, and means for selectively transferring alternate torque impulses from the driving member to the driven member comprising a fluid pump operable by relative motion between the driving member and the driven member, an intake passage for fluid to be pumped, an outlet passage for the pumped fluid, valve means controlling the outlet passage for selectively determining the direction of the alternate torque impulses transferred, and means for positively maintaining the fluid in the intake passage under a pressure considerably above atmospheric comprising a second fluid pump driven by one of said members.

13. In a fluid clutch, the combination of a driving member, members constituting motion converting means for receiving a unidirectional torque from a suitable source of power and for transmitting an alternately reversing torque to the driving member, a driven member, and means for selectively transferring alternate torque impulses from the driving member to the driven member comprising a fluid pump operable by relative motion between the driving member and the driven member, an intake passage for fluid to be pumped, an outlet passage for the pumped fluid, valve means controlling the outlet passage for selectively determining the direction of the alternate torque impulses transferred, means for positively maintaining the fluid in the intake passage under a pressure considerably above atmospheric comprising a second fluid pump driven by one of said members, and fluid passages connecting the second pump with the intake passage and with the bearings of at least one of the members.

14. In a fluid clutch, the combination of a driving member, motion converting means for receiving a unidirectional torque from a suitable source of power and for transmitting an alternately reversing torque to the driving member, a driven member, and means for selectively transferring alternate torque impulses from the driving member to the driven member comprising a fluid pump operable by relative motion between the driving member and the driven member, an intake passage for fluid to be pumped, an outlet passage for the pumped fluid, valve means controlling the outlet passage for selectively determining the direction of the alternate torque impulses transferred, and means for positively maintaining the fluid in the intake passage under a pressure considerably above atmospheric comprising a second fluid pump driven by a portion of the motion converting means.

15. In a fluid clutch, the combination of a driving member, motion converting means for receiving a unidirectional torque from a suitable source of power and for transmitting an alternately reversing torque to the driving member, a driven member, and means for selectively transferring alternate torque impulses from the driving member to the driven member comprising a fluid pump operable by relative motion between the driving member and the driven member, an intake passage for fluid to be pumped, an outlet passage for the pumped fluid, valve means controlling the outlet passage for selectively determining the direction of the alternate torque impulses transferred, means for positively maintaining the fluid in the intake passage under a pressure considerably above atmospheric comprising a second fluid pump driven by a portion of the motion converting means, and fluid passages through the motion converting means and the driving member connecting the second pump with the intake passage and with the bearings of said members and the motion converting means.

16. In a fluid clutch, the combination of a driving member, motion converting means for receiving a unidirectional torque from a suitable source of power and for transmitting an alternately reversing torque to the driving member about an axis perpendicular to the axis of the unidirectional torque, a driven member, and means for selectively transferring alternate torque impulses from the driving member to the driven member comprising a fluid pump operable by relative motion between the driving member and the driven member.

17. In a fluid clutch, the combination of a driving member, motion converting means for receiving a unidirectional torque from a suitable source of power and for transmitting an alternately reversing torque to the driving member about an axis perpendicular to the axis of the unidirectional torque and including a Z-shaped crank member rotating with the source of power, a bifurcated portion on the driving member surrounding the Z-shaped crank at its mid-portion, pintle portions extending perpendicularly from the bifurcated portion, and a split yoke member surrounding and connecting the Z-shaped crank and the pintles, a driven member, and means for selectively transferring alternate torque impulses from the driving member to the driven member comprising a fluid pump operable by relative motion between the driving member and the driven member.

18. In a fluid clutch, the combination of a driving member, motion converting means for receiving a unidirectional torque from a suitable source of power and for transmitting an alternately reversing torque to the driving member, a driven member, and means for selectively transferring alternate torque impulses from the driving member to the driven member comprising a fluid pump operable by relative motion between the driving member and the driven member, an intake passage for fluid to be pumped, and means for positively maintaining the fluid in the intake passage under a pressure considerably above atmospheric.

19. In a fluid clutch, the combination of a driving member, members constituting motion converting means for receiving a unidirectional torque from a suitable source of power and for transmitting an alternately reversing torque to the driving member, a driven member, and means for selectively transferring alternate torque impulses from the driving member to the driven member comprising a fluid pump operable by relative motion between the driving member and the driven member, an intake passage for fluid to be pumped, and means for positively maintaining the fluid in the intake passage under a pressure considerably above atmospheric comprising a second fluid pump driven by one of said members.

20. In a fluid clutch, the combination of a driving member, members constituting motion converting means for receiving a unidirectional torque from a suitable source of power and for transmitting an alternately reversing torque to the driving member, a driven member, and means for selectively transferring alternate torque impulses from the driving member to the driven member comprising a fluid pump operable by relative motion between the driving member and the driven member, an intake passage for fluid to be pumped, means for positively maintaining the fluid in the intake passage under a pressure considerably above atmospheric comprising a second fluid pump driven by one of said members, and fluid passages connecting the second pump with the intake passage and with the bearings of at least one of the members.

21. In a fluid clutch, the combination of a driving member, motion converting means for receiving a unidirectional torque from a suitable source of power and for transmitting an alternately reversing torque to the driving member, a driven member, and means for selectively transferring alternate torque impulses from the driving member to the driven member comprising a fluid pump operable by relative motion between the driving member and the driven member, an intake passage for fluid to be pumped, and means for positively maintaining the fluid in the intake passage under a pressure considerably above atmospheric comprising a second fluid pump driven by a portion of the motion converting means.

22. In a fluid clutch, the combination of a driving member, motion converting means for receiving a unidirectional torque from a suitable source of power and for transmitting an alternately reversing torque to the driving member, a driven member, and means for selectively transferring alternate torque impulses from the driving member to the driven member comprising a fluid pump operable by relative motion between the driving member and the driven member, an intake passage for fluid to be pumped, means for positively maintaining the fluid in the intake passage under a pressure considerably above atmospheric comprising a second fluid pump driven by a portion of the motion converting means, and fluid passages through the motion converting means and the driving member connecting the second pump with the intake passage and with the bearings of said members and the motion converting means.

23. In a fluid clutch, the combination of an oscillating driving member, a driven member, a fluid pump comprising two relatively movable members, one connected to each element, and valve means positively operated by relative motion between said members to block the flow of fluid in one direction of relative motion of said members while permitting substantially free flow of fluid in the opposite direction.

24. In a fluid clutch, the combination of a driving member, motion converting means for receiving a unidirectional torque from a suitable source of power and for transmitting an alternately reversing torque to the driving member, a driven member, and means for selectively transferring alternate torque impulses from the driving member to the driven member comprising a fluid pump operable by relative motion between the driving member and the driven member, an intake passage for fluid to be pumped, an outlet passage for the pumped fluid, and valve means for selectively determining the direction of the alternate torque impulses transferred.

25. In a fluid clutch, the combination of a driving member, motion converting means for receiving a unidirectional torque from a suitable source of power and for transmitting an alternately reversing torque to the driving member, a driven member, and means for selectively transferring alternate torque impulses from the driving member to the driven member comprising a fluid pump operable by relative motion between the driving member and the driven member, an intake passage for fluid to be pumped, an outlet passage for the pumped fluid, and means controlling the fluid flow through said pump for selectively determining the direction of the alternate torque impulses transferred.

26. In a fluid clutch, the combination of a driving member, motion converting means for receiving a unidirectional torque from a suitable source of power and for transmitting an alternately reversing torque to the driving member, a driven member, and means for selectively transferring alternate torque impulses from the driving member to the driven member comprising a fluid pump operable by relative motion between the driving member and the driven member.

27. In a fluid clutch, the combination of a driving member, motion converting means comprising eccentric journals and connecting linkage for receiving a unidirectional torque from a suitable source of power and for transmitting an alternately reversing torque to the driving member, a driven member, and means for selectively transferring alternate torque impulses from the driving member to the driven member comprising a fluid pump operable by relative motion between the driving member and the driven member.

28. In a fluid clutch, the combination of a driving member, motion converting means for receiving a unidirectional torque from a suitable source of power and for transmitting an alternately reversing torque to the driving member, a driven member, and means for selectively transferring torque impulses of one sense only from the driving member to the driven member comprising a fluid pump operable by relative motion between the driving member and the driven member, an intake passage for fluid to be pumped, and means for positively maintaining the fluid in the intake passage under a pressure considerably above atmospheric.

29. In a fluid clutch, the combination of a driving member, motion converting means for receiving a unidirectional torque from a suitable source of power and for transmitting an alternately reversing torque to the driving member, a driven member, and means for selectively transferring alternate torque impulses from the driving member to the driven member comprising a fluid pump operable by relative motion between the driving member and the driven member, an intake passage for fluid to be pumped, an outlet passage for the pumped fluid, and means for selectively determining the direction of the alternate torque impulses transferred.

30. In a fluid clutch, the combination of a driving member, motion converting means for receiving a unidirectional torque from a suitable source of power and for transmitting an alternately reversing torque to the driving member, a driven member, and means for selectively transferring alternate torque impulses from the driving member to the driven member comprising a fluid pump operable by relative motion between the driving member and the driven member, an intake passage for fluid to be pumped, an outlet passage for the pumped fluid, and valve means for selectively varying the amount of slippage with which the alternate torque impulses are transferred.

31. In a fluid clutch, the combination of a driving member, motion converting means for receiving a uni-directional torque from a suitable source of power and for transmitting an alternately reversing torque to the driving member, a driven member, and means for selectively transferring alternate torque impulses from the driving member to the driven member comprising a fluid pump operable by relative motion between the driving member and the driven member, an intake passage for fluid to be pumped, an outlet passage for the pumped fluid, and means controlling the amount of fluid flow through the pump for selectively varying the amount of slippage with which alternate torque impulses are transferred.

32. In a fluid clutch, the combination of a driving member, motion converting means for receiving a uni-directional torque from a suitable source of power and for transmitting an alternately reversing torque to the driving member, a driven member, and means for selectively transferring alternate torque impulses from the driving member to the driven member comprising a fluid pump operable by relative motion between the driving member and the driven member, an intake passage for fluid to be pumped, an outlet passage for the pumped fluid, and means controlling the pump for selectively varying the amount of slippage with which alternate torque impulses are transferred.

33. In a fluid clutch, the combination of a driving member, motion converting means for receiving a uni-directional torque from a suitable source of power and for transmitting an alternately reversing torque to the driving member, a driven member, and means for selectively transferring alternate torque impulses from the driving member to the driven member comprising a fluid pump operable by relative motion between the driving member and the driven member, an intake passage for fluid to be pumped, an outlet passage for the pumped fluid, and valve means controlling the outlet passage for selectively varying the amount of slippage with which alternate torque impulses are transferred.

34. In a clutch, the combination of a driving member, motion converting means for receiving a unidirectional torque from a suitable source of power and for transmitting an alternately reversing torque to the driving member, a driven member, means for selectively transferring alternate torque impulses from the driving member to the driven member, and means for selectively determining the direction of the alternate driving torque impulses transferred, operable to transfer torque impulses with selectively variable degrees of slippage.

35. In a clutch, the combination of a driving member, motion converting means for receiving a unidirectional torque from a suitable source of power and for transmitting an alternately reversing torque to the driving member, a driven member, and means for selectively transferring alternate driving torque impulses from the driving member to the driven member including a one-way clutch and means for varying the amount of slippage of the clutch occurring during the transfer of a torque impulse.

36. In a clutch, the combination of a driving member, motion converting means comprising eccentric journals and connecting linkage for receiving a unidirectional torque from a suitable source of power and for transmitting an alternately reversing torque to the driving member, a driven member, and means for selectively transferring alternate driving torque impulses from the driving member to the driven member including a one-way clutch and means for varying the amount of slippage of the clutch occurring during the transfer of a torque impulse.

37. In a clutch, the combination of a driving member, motion converting means for receiving a unidirectional torque from a suitable source of power and for transmitting an alternately reversing torque to the driving member, a driven member, and means for selectively transferring alternate torque impulses from the driving member to the driven member including a one-way clutch, means for reversing the one-way action of the clutch and for varying the amount of slippage of the clutch occurring during the transfer of a torque impulse.

38. In a clutch, the combination of a driving member, motion converting means comprising eccentric journals and connecting linkage for receiving a unidirectional torque from a suitable source of power and for transmitting an alternately reversing torque to the driving member, a driven member, and means for selectively transferring alternate torque impulses from the driving member to the driven member including a one-way clutch, means for reversing the one-way action of the clutch, and for varying the amount of slippage of the clutch occurring during the transfer of a torque impulse.

CHARLES J. ANDERSON, Jr.